W. W. REYNOLDS.
PLATFORM-SCALES.
No. 6,888. Reissued Feb. 1, 1876.
Fig. 1.
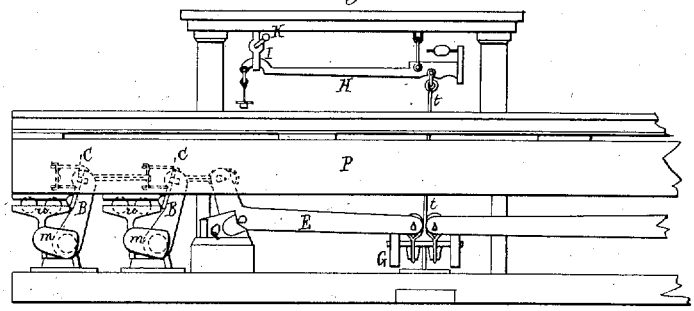
F
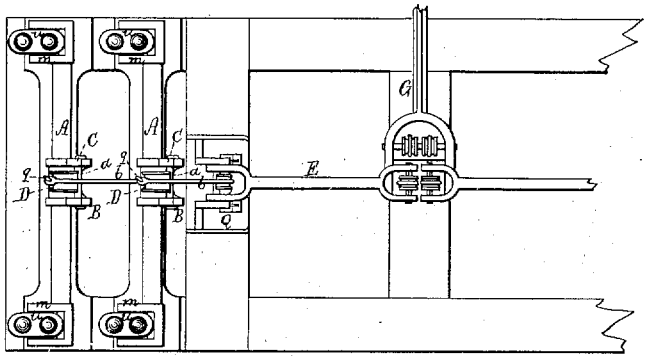
Fig. 3.
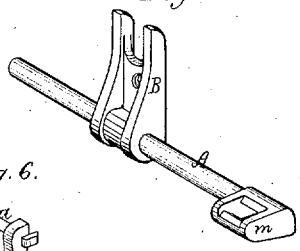
Fig. 5.
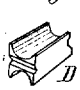
Fig. 6.
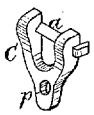
Fig. 4.
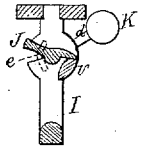
Fig. 7
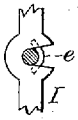
Fig. 8.
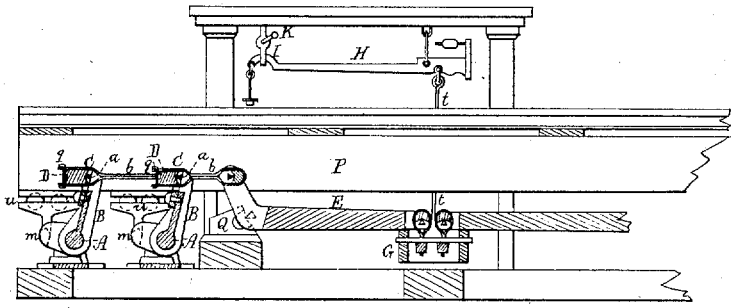
Witnesses
S. W. Piper
S. W. Miller
Wm. W. Reynolds.
by his attorney
R. H. Eddy

UNITED STATES PATENT OFFICE.

WILLIAM W. REYNOLDS, OF BRANDON, VERMONT, ASSIGNOR TO THE BRANDON MANUFACTURING COMPANY.

IMPROVEMENT IN PLATFORM-SCALES.

Specification forming part of Letters Patent No. 132,321, dated October 15, 1872; reissue No. 6,888, dated February 1, 1876; application filed December 1, 1875.

*To all whom it may concern:*

Be it known that I, WILLIAM W. REYNOLDS, of Brandon, in the county of Rutland and State of Vermont, have invented new and useful Improvements in Platform-Scales; and do hereby declare the same to be described in the following specification and represented in the accompanying drawings.

My invention consists in certain improvements in platform-scales, especially in such as are for weighing railway-cars and their freight or contents while at rest or in motion on the platforms of said scales, such invention being to overcome the difficulty heretofore often experienced of obtaining correct weight by reason of torsion of the levers below the platform.

Of the said drawings, Figure 1 is a side elevation of a platform-scale with my said invention. Fig. 2 is a top view of the system of levers and their connections. Figs. 3, 4, 5, 6, and 7 represent details to be hereinafter explained. Fig. 8 is a longitudinal section.

In the said drawings, A A denote two shafts arranged parallel to each other and transversely underneath the platform P, each of the said shafts being provided at each of its ends with short knife-edged arms *m*, and also another and larger arm, B, at its middle. This latter arm extends up from the shaft at right angles thereto, and in a plane at a right angle with the two end arms of the shaft. There is pivoted to each arm B a vibratory knife-edge supporter, C, provided with a knife-edge, *a*, and a pivot-hole, *p*. This supporter C is shown in perspective view in Fig. 6, it being to engage with a solid bearing-block, D, (also shown in perspective view in Fig. 5,) applied to a rod or connection, *b*. The said block D, grooved on its sides and ends, or constructed as shown in Fig. 5, admits of another rod or connection, *b*, being joined with the first rod *b* by means of a pin, *q*, which, going through the two rods, serves to connect them and aid in holding the block in place. The two vibratory knife-edge supporters C C are applied to the arms B B, having their bearing-blocks D D connected together and with the angular lever E by rods *b b*, one of which is pivoted to the shorter arm of the said angular lever, such lever E being arranged with the levers A B *m* in manner as shown, and pivoted to a stationary support, Q. The lever E, by means of a hanger and knife-edge bearings, is connected with the shorter arm of a lever, G, whose longer arm is joined with the weigh-beam H by a rod, *t*, pivoted to the two.

In practice, the platform, one-half of which is shown as supported on bearings *u u*, resting on the knife-edges of the shorter arms of the levers A B *m*, is also to have other similar supports, and another set of levers, A B *m* E, which are to be arranged under its opposite half and connected with the lever G.

I represents the rack that receives the weigh-beam H, such rack being provided with a rotary stop, J, arranged within it in manner as shown in Fig. 4, and when up resting on a shoulder, *v*. The said stop J is pivoted in the sides of the rack, and outside of the rack such stop has projected from one of its pivots an arm, *d*, carrying an overbalance ball or weight, K, which serves to hold the stop when in either of its extreme positions.

The ball K, instead of being directly over the weigh-beam and within the rack, as heretofore, by which it is rendered inconvenient to operate it, is now entirely outside of the rack, where it can be manipulated and access obtained to it to better advantage, comparatively speaking.

In the opposite sides of the rack are angular openings to admit the pivots of the stop J, each of which pivots is held in position in the slot by means of a bent wire or staple, *e*, inserted in holes in the sides of the slot, the same being as shown in Fig. 7. This having been done, the slot is to be filled with soft metal.

Having thus described my invention, what I claim as new, and desire to secure by Letters Patent, is—

1. The knife-edge supporter C, provided with the knife-edge *a*, and pivoted to the arm B of the platform-bearing levers, such application being for use as set forth.

2. The combination of the bent lever E, one or more shafts, A, and the end arms *m m* and intermediate arm B, extended from each of said shafts, as set forth, such lever E and the said arm or arms B having connections, and all being applied to a scale-platform, P, substantially as represented.

3. The combination of the levers G E one or more shafts, A, and end and intermediate arms *m m* B, extended from each of such shafts, as represented, the said levers, shaft or shafts A, and the arm or arms B thereof having connections, and being arranged with a platform, P, all substantially as explained.

4. The overbalance-ball K and its arm *d*, arranged outside of the beam-rack I, in combination with the stop J, arranged within such rack and connected with such arm, all being as shown and described.

WM. W. REYNOLDS.

Witnesses:
G. W. PARMENTER,
H. C. COPELAND.